Oct. 10, 1939.     L. R. SHARDLOW     2,175,707
SPACER FOR ELECTRON DISCHARGE DEVICES
Filed Feb. 26, 1938
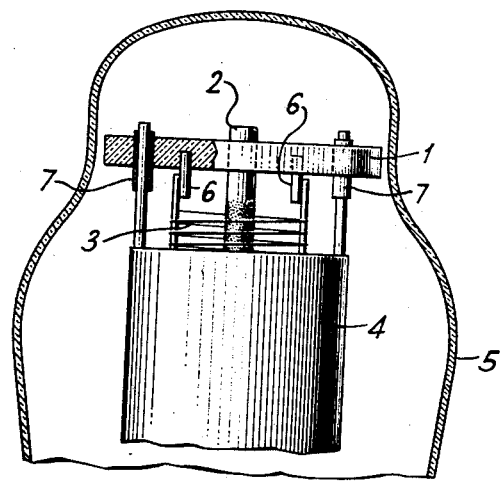
INVENTOR.
LAWRENCE RUSSEL SHARDLOW
BY Charles McClair
ATTORNEY.

Patented Oct. 10, 1939

2,175,707

UNITED STATES PATENT OFFICE 2,175,707

SPACER FOR ELECTRON DISCHARGE DEVICES

Lawrence Russel Shardlow, Arlington, N. J., assignor, by mesne assignments, to Radio Corporation of America, New York, N. Y., a corporation of Delaware Application February 26, 1938, Serial No. 192,744

3 Claims. (Cl. 250—27.5)

My invention relates to ceramic insulators, particularly ceramic spacers for electron discharge devices.

It is desirable in electrode assemblies to firmly attach insulating spacers to the metal electrodes supported by the spacers, but the hardness and brittleness of ceramic spacers make it difficult to clinch staples or rivets to the spacers tight enough to prevent microphonics.

An object of my invention is improved ceramic insulators, such as ceramic spacers, to which electrodes and metal parts of an electron discharge device may be secured more firmly than to ceramic spacers heretofore used.

Metal sleeves, studs or side rods to which electrodes may be secured are cast in a mold according to one embodiment of my invention with a ceramic mixture or slip prepared in accordance with my invention, and fired to harden the ceramic and fuse it solidly to the metal pieces in the molded ceramic. My improved ceramic composition hardens at a temperature below the melting temperature of nickel or iron and produces a strong ceramic body that has good electrical properties, is porous and easy to degas, and bonds firmly to metal.

A powdered refractory metal oxide, such as alumina or magnesia, is ball-milled with talc or feldspar and with silica to the desired fineness, mixed with an organic binder such as wax or nitrocellulose, dissolved in a solvent, and pressed in molds to the desired shape. Metal inserts, such as sleeves or studs, may be molded in the relatively soft ceramic body when it is pressed or may be inserted in holes in the body after molding. The ceramic body and its inserts are then transferred to a furnace where the ceramic is fired, preferably in a reducing atmosphere, to a temperature below the melting or deformation temperature of the metal inserts, yet sufficiently high to chemically react the silica and talc, harden the ceramic and join it securely to the metal inserts. My improved ceramic material when fired shrinks on to the metal inserts and improves the bond between the ceramic and its inserts. Electrodes may be assembled by fastening side rods or extensions on the electrodes to the metal inserts as by welding and after mounting in an envelope may be easily degassed and sealed off.

A better understanding of my invention may be had by referring to the following specification and to the accompanying drawing which discloses preferred embodiments of my invention. For purposes of illustrating one useful embodiment of my invention, a ceramic spacer 1 is shown in the drawing for insulatingly spacing cathode 2, grid 3 and anode 4 mounted as a unitary assembly in envelope 5. The side rods of the grid are joined as by welding to studs 6 embedded and fixedly secured in my improved spacer, and the side rods of anode 4 are inserted through and spot welded to tubular metal inserts 7 extending through and shrink-fitted in the ceramic.

To secure the metal inserts, such as stud 6 and metal sleeves 7, in the ceramic spacer 1, I prepare according to my invention a ceramic composition which when fired with the metal inserts in place shrinks over the inserts to tightly hold them in place. My improved ceramic readily hardens at a temperature below the softening temperature of iron or nickel, which may advantageously be used for the inserts, and produces a mechanically strong and porous body which is easy to degas during exhaust.

I make the bulk of my insulator body of finely ground particles of alumina ($Al_2O_3$). While many binders have been suggested and used in the prior art, none have, to the best of my knowledge, been suggested which will bind together the particles of the insulator material to make a mechanically strong and low electrical loss body having sufficient porosity to permit easy degassing and having proper shrinkage during firing to bind and join metal inserts of iron or nickel. According to my invention I add two binding materials to my insulator which apparently, with proper heat treatment, cooperatively react to bind by incipient fusion the interfaces of the particles of the main body. The two binding agents which I add to my insulator have been found to so interlock the particles of the insulator without vitrifying those particles that the finished body has extraordinary mechanical strength, is porous and easy to degas, has exceptionally good electrical properties at all frequencies and has the right percentage of shrinkage to bind metal inserts having the coefficient of thermal expansion substantially that of iron or nickel.

Powdered aluminum oxide of commercial purity, the main constituent of my insulating material, is combined with powdered silica and with powdered acid magnesium meta-silicate, commercially known as talc. The alumina, preferably the grade commercially known as "bauxite ore, concentrated, special purity" and containing less than .02% alkali is preferably calcined one hour at from 1500° to 1600° C., ball-milled until 90% of the material is finer than 2 microns in diameter, and screened through a standard 100 mesh sieve. The talc of commercial grade is powdered and screened through a 325 mesh sieve and the silica is preferably air floated to a particle size corresponding to 325 or finer mesh screen and containing less than about .10% impurities. Good results have been obtained by combining these three powders in the proportions 55% alumina, 30% talc, and 15% silica. A slip is conveniently prepared by adding 100 parts of the ceramic ingredients with 6 parts of commercial wax, such as domestic paraffin, dissolved in carbon tetrachloride. To insure complete and uniform coating of the particles or aggregates with a film of paraffin, the slip is ball-milled for three hours whereupon the slip may be poured from the ball-mill and the carbon tetrachloride removed by slow heating in air at about 110° C. for approximately 12 hours. The resulting aggregate may then be crumbled and when slightly warm screened through a 40 mesh sieve to obtain a powder of paraffin coated particles. The powder may now be pressed in steel molds into the desired insulator shapes by means of a plunger preferably at a pressure of about 5000 pounds per square inch.

The metal inserts 6 and 7 may be positioned in the pressed green ceramic spacer either before or after the spacer is pressed and formed in the mold. Openings or holes in the face of the press mold plungers may conveniently be provided to receive the metal pieces 6 and 7 before the ceramic aggregate is deposited in the mold and pressed. Alternatively holes may be drilled in the pressed ceramic insulators after they have been pressed and the metal pieces 6 and 7 inserted in the holes. The pressed insulator bodies in their unfired or green state are firm and coherent enough to be handled without breakage, the particles of the body being held together by their coherent coatings of organic binder. To remove the organic binder I prefer to prefire the insulator bodies in air as follows: raise the temperature of the oven containing the insulators to 220° C. and hold for six hours, then raise the temperature to 800° and hold at this temperature for 45 minutes; then raise the temperature to 1050° to 1100° and hold at this temperature for 45 minutes. The insulators may then be removed from the oven after the temperature has dropped to 400° or lower. If desired the prefired material may be drilled or cut and metal pieces 6 and 7 inserted in the holes provided.

The insulator body is finally fired and hardened in a wet hydrogen atmosphere at about 1350° C. for 135 seconds. An insulator thus produced is exceptionally strong and is porous, much like a porcelain filter, its surface having a uniform satiny white appearance as distinguished from the glassy vari-colored surface of the usual lavite.

While I prefer to use 55% alumina with 30% talc and 15% silica, the alumina may be varied within the scope of my invention in proportion between 45% and 65% of the total and the talc may be varied between 20% and 35%, and the silica varied between 10% and 25%. Mixtures of these proportions before firing produce ceramics in which after firing there may be found by anaylsis substantially 4% to 6.5% magnesium, 12% to 33% silicon, and 24% to 35% aluminum, corresponding to about

| | Per cent |
|---|---|
| MgO | 6.5 to 11.5 |
| SiO$_2$ | 26. to 44.5 |
| Al$_2$O$_3$ | 46. to 66. |

Slight variations in these percentages found by analysis may be due probably to varying amounts of impurities. Good results have been obtained by replacing the alumina with magnesia, and the talc may also be replaced by feldspar.

Electrical insulators prepared with the ingredients in the proportions above specified produce an insulator body that is mechanically strong, has good insulating properties and has a linear shrinkage during firing, which will firmly bond the insulating body to metal inserts having coefficients of expansion near that of iron or nickel. I have found that these bodies may be developed with high mechanical strength between 1250° C. and 1400° C., the firing temperature being dependent on the exact composition, and they may be fired in a reducing atmosphere to protect the inert metals from oxidation. While the bodies are mechanically strong and have good electrical properties they are very porous at the correct maturing temperature, the high porosity being of great advantage in exhausting and degassing vacuum tubes in which they are mounted. The linear firing shrinkage is sufficiently high to firmly grip metal tubes inserted in holes in unfired ceramic, provided the diameter of the hole is not more than about 8% greater than the outside diameter of the tube. After a prefiring to 1000–1100° C. the final firing can be accomplished in 120 to 180 seconds at the correct maturing temperature, which is dependent upon the exact composition, in a reducing atmosphere. Electrodes joined to metal inserts in insulators prepared according to my invention are rigidly held in place, thus minimizing microphonic noises and materially facilitating the manufacture of radio tubes in which good electrical properties are necessary. Since the electrical and mechanical characteristics of my insulator may probably be obtained with proportions beyond the limits above specified by the proper adjustment of firing schedule to obtain the partial fusion between the particles in the insulator body, it is desired that my invention be limited only by the prior art and by the terms of the following claims.

I claim:

1. An electron discharge device comprising an envelope, an electrode assembly in said envelope comprising a plurality of electrodes, a ceramic spacer for rigidly holding said electrodes in insulated spaced relation, metal inserts embedded in and bonded directly to the ceramic of said spacer, said electrodes being secured to said inserts, said ceramic being porous and comprising 6.5% to 11.5% magnesium oxide, 26% to 44.5% silicon dioxide, and 46% to 66% aluminum oxide.

2. An electron discharge device comprising an envelope, an electrode spacer in said envelope comprising an unvitrified ceramic body of alumina, silica and magnesia intimately admixed and fired into a dense coherent porous mass consisting by weight of about 46% to 66% alumina, 26% to 44.5% silica and 6.5% to 11.5% magnesia, spaced ferrous metal pieces embedded in and held in the ceramic body by a direct bond between the metal of the pieces and a ceramic of the body, and electrodes in said envelopes joined to said metal pieces.

3. An electron discharge device comprising an envelope, electrodes in said envelope, an electrode spacer in said envelope comprising an unvitrified ceramic body of alumina, silica and magnesia intimately admixed and fired into a dense coherent porous mass and containing approximately 4% to 6.5% magnesium, 12% to 33% silicon and 24% to 35% aluminum, spaced ferrous metal pieces embedded in said body and held in place in the body by a direct bond between the metal of the pieces and the ceramic of the body, said electrodes being joined to said metal pieces.

L. RUSSEL SHARDLOW.